(12) United States Patent
Thomson et al.

(10) Patent No.: US 9,958,357 B2
(45) Date of Patent: May 1, 2018

(54) DETECTING IRREGULARITIES IN A ROTATION OF ROLLER BODIES IN A ROLLER BEARING

(71) Applicant: AKTIEBOLAGET SKF, Göteborg (SE)

(72) Inventors: Allan Thomson, Lanark (GB); Andreas Clemens Van Der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 319 days.

(21) Appl. No.: 14/651,420

(22) PCT Filed: Dec. 12, 2012

(86) PCT No.: PCT/EP2012/075293
§ 371 (c)(1),
(2) Date: Jun. 11, 2015

(87) PCT Pub. No.: WO2014/090305
PCT Pub. Date: Jun. 19, 2014

(65) Prior Publication Data
US 2015/0338310 A1 Nov. 26, 2015

(51) Int. Cl.
*G01B 5/28* (2006.01)
*G01B 5/30* (2006.01)
*G01M 13/04* (2006.01)
*F16C 19/52* (2006.01)
*F16C 41/00* (2006.01)

(52) U.S. Cl.
CPC ............. *G01M 13/04* (2013.01); *F16C 19/52* (2013.01); *F16C 19/522* (2013.01); *F16C 41/008* (2013.01)

(58) Field of Classification Search
CPC ........ G01M 13/04; F16C 19/52; F16C 19/522; F16C 41/008
See application file for complete search history.

(56) References Cited

U.S. PATENT DOCUMENTS

| | | | |
|---|---|---|---|
| 4,196,629 A | 4/1980 | Philips | |
| 4,870,271 A * | 9/1989 | Philips | F16C 19/52 250/231.1 |
| 6,535,135 B1 * | 3/2003 | French | B61K 9/04 340/682 |

(Continued)

FOREIGN PATENT DOCUMENTS

| | | |
|---|---|---|
| EP | 0800072 A2 | 10/1997 |
| EP | 2019304 A2 | 1/2009 |

*Primary Examiner* — Toan Le
(74) *Attorney, Agent, or Firm* — Bryan Peckjian; SKF USA Inc. Patent Dept.

(57) ABSTRACT

An apparatus for detecting irregularities in a rotation of roller bodies in a roller bearing, the apparatus comprising a measurement module and a processor module. The measurement module is operable to provide a deformation signal indicative of a deformation of a surface region of a bearing ring of the roller bearing, wherein the deformation is due to the rotation of the roller bodies over the surface region. The processor module is operable to extract one or more signal quantities of interest from the deformation signal and operable to provide statistical information on the one or more extracted signal quantities of interest.

15 Claims, 7 Drawing Sheets

(56) References Cited

U.S. PATENT DOCUMENTS

| | | | |
|---|---|---|---|
| 7,270,016 B2 * | 9/2007 | Sentoku | B60B 27/0005 |
| | | | 73/862.322 |
| 7,444,888 B2 * | 11/2008 | Mol | G01L 5/0019 |
| | | | 73/862.322 |
| 7,780,357 B2 * | 8/2010 | Varonis | G01P 3/443 |
| | | | 324/178 |
| 2008/0234964 A1 | 9/2008 | Miyasaka | |

* cited by examiner

DETECTING IRREGULARITIES IN A ROTATION OF ROLLER BODIES IN A ROLLER BEARING

CROSS REFERENCE TO RELATED APPLICATIONS

This is a United States National Stage application claiming the benefit of International Application Number PCT/EP2012/075293 filed on 12 Dec. 2012, which is incorporated herein by reference in its entirety.

FIELD OF THE INVENTION

Embodiments of the present invention relate to condition monitoring of roller bearings and in particular to apparatuses and methods for detecting irregularities in a rotation of roller bodies in a roller bearing.

BACKGROUND

Condition monitoring of roller bearings is of increasing importance, particularly in applications with roller bearings of intermediate and greater size, such as for example the roller bearings used in trains, wind energy converters or in other types of power plants.

One particular example of an operating condition to be monitored is the monitoring of a present load on the bearing, which has significant impact on the calculation of a remaining service live, the occurrence of over-load conditions or of under-load conditions, etc. However, apart from directly gathering information on operating conditions of a roller bearing, condition monitoring may also be utilized to determine useful information on a major system embodying the particular roller bearing. For example, if roller bearings in the hubs or wheels of an automobile or train are employing load sensing, the individual load on the wheels may be determined such as to, for example, electronically control the amount of power provided to each driven wheel or the amount of braking power applied to each of the wheels.

Despite its undeniable benefits, condition monitoring of roller bearings is only rarely used, since different types of sensors, evaluation electronics and communication electronics utilized to communicate the determined load or another operating condition to a monitoring circuit have to be separately installed on the roller bearing, wired together and provided with operating energy. It may be rather time consuming and expensive to individually attach the different sensor types and the associated evaluation electronics and energy sources to the roller bearings. Furthermore, conventional solutions require excessive evaluation of raw measurement or monitoring data.

Hence, there is a desire for a concept allowing implementing condition monitoring in roller bearings more efficiently.

SUMMARY OF THE PRESENT INVENTION

Embodiments of the present invention allow for the detection of irregularities in a rotation of roller bodies, for example, due to cage failure or unwanted behavior of a segmented cage or even a loss of a roller body. For that purpose, the strain at a side face of the roller bearing and/or the strain at a location around the circumference of the bearing ring may be measured to obtain the strain variations caused by the rollers passing. That is to say, embodiments use load sensing which uses strain variation caused by rollers passing at a certain location of an inner or an outer ring of a roller bearing.

According to one aspect of the present invention it is provided a method for detecting irregularities in a rotation of roller bodies in a roller bearing. The method comprises a step of providing a deformation signal indicative of a deformation of a surface region of a bearing ring of the roller bearing. Thereby the deformation is due to the rotation of the roller bodies over said surface region during operation of the roller bearing. Further, the method comprises a step of extracting one or more signal quantities or parts of interest from the deformation signal and a step of providing statistical information on the one or more extracted signal quantities/parts of interest.

The method may be applied to arbitrary roller bearings, such as radial or axial bearings, including ball bearings, cylindrical roller bearings, needle roller bearings, tapered roller bearings, or spherical roller bearings. Consequently, the roller bodies or rolling elements may be from the group of balls, needles, tapered rollers and spherical rollers. For example, a (deep-groove) ball-bearing is designed for supporting predominantly radial loads, whereas a spherical roller bearing is typically designed for accommodating both heavy radial loads as well as heavy axial loads. In a radial bearing, the inner and outer bearing ring are not only co-axial but also concentric. That is, the inner ring lies concentrically within the outer ring, and the inner ring and the outer ring lie in substantially the same plane substantially perpendicular to the rotation axis. The paths traversed by the plurality of rolling elements, when the radial bearing is in operational use, are concentric with the inner and the outer ring. The inner ring and the outer ring form a coplanar configuration and rotate coaxially relative to each other.

In an axial bearing, the inner and the outer ring are arranged so as to be co-axial, but not concentric. The first inner ring lies in a first plane substantially perpendicular to the rotation axis, and the outer ring lies in second plane substantially perpendicular to the rotation axis and spaced apart from the first plane. The paths traversed by the plurality of rolling elements when the axial bearing is in operational use, are coaxial with the inner and outer ring, but lie in another plane substantially parallel with the first plane and second plane.

In embodiments providing the deformation signal comprises generating or measuring, in an operational state of the roller bearing, the deformation signal by means of a deformation sensor coupled to the surface region of the (inner and/or outer) bearing ring. Thereby the deformation sensor may comprise at least one strain gauge to measure the strain or mechanical deformation of the surface region when roller bodies pass said surface region under radial and/or axial load of the roller bearing. As the surface region is deformed due to the load transferred via the rollers, a foil of the strain gauge on the surface region may be deformed, causing its electrical resistance to change. This resistance change, usually measured using a Wheatstone bridge, is related to the strain by a quantity known as the gauge factor. In principle, other sensor concepts are also conceivable, such inductive, capacitive, optical, or magnetic deformation sensors coupled or attached to the roller bearing or the raceway thereof and measuring the deformation by means of other physical quantities. Ideally, the resulting deformation signal will be a sinusoidal signal having peaks of deformation when roller bodies under mechanical load pass the measurement surface coupled to the deformation sensor. When there are irregularities, for example, in roller element spacing, the essentially sinusoidal measurement signal will become irregular, for example with respect to frequency components, signal amplitudes, etc.

Although some embodiments are directed towards providing the deformation signal with respect to elastic deformations of inner surfaces of the bearing rings forming raceways, i.e., to surface regions being essentially parallel to a rotation axis of the roller bearing, other embodiments of the present invention comprise determining a deformation of a surface region which is essentially perpendicular to a rotation axis of the roller bearing. This may particularly be the case, when a so-called "side load measurement" is utilized. This may particularly be the case, when the deformation sensor is operable to determine a deformation of a surface region which is essentially perpendicular to the rotation axis. That is, in the example of a radial bearing, the deformation sensor would be operable to provide a deformation signal that is indicative of a deformation of a radially extending side face of the bearing ring, such as a flange. Particularly compact implementations of measurement modules may become feasible by utilizing side load measurement, which is based on the sensing and further processing of a deformation of a surface region on a bearing ring which is essentially perpendicular to the rotation axis. More generally, with side load measurement, a deformation of a surface region which is substantially different than any surface parallel to the rotation axis may be utilized.

The deformation of such a surface region is caused by the load as transferred from the inner ring to the outer ring via the rolling elements of the bearing. In particular, when a rolling element passes an area neighbored to the particular surface region, the load as transferred via the rolling element causes an elastic deformation of the inner or outer ring and hence a deformation of the surface region of the bearing ring. Even when the vector of the main load on the roller bearing points into a different direction than the surface normal of the surface region, a conclusion on the direction and the strength of the load vector can be drawn when the mechanical characteristics of the roller bearing, in particular the material and the dimensions of the bearing rings and the number, dimension and material of the rolling elements are known. The determination of the load vector may, for example, be performed using Finite Element Analysis Methods (FEM), modeling the deformation characteristic of the roller bearing in different operating conditions, for example at different load vector directions, temperatures or the like. This concept may be utilized to determine the load on radial bearings as well as on axial bearings.

In some embodiments providing the deformation signal, which may include measuring the deformation signal in a sub-step, may also comprise storing the deformation signal in a memory device for a subsequent statistical analysis. For this reason a measurement module installed at or attached to the roller bearing in a same housing, as, for example, a housing of a wind energy plant, may comprise an electronic storage device, such as a semiconductor memory. The stored deformation signal samples may then be analyzed to extract the statistical information of interest.

According to embodiments of the present invention providing the statistical information may comprise providing, based on the deformation signal, a signal indicative of a probability distribution of the one or more deformation signal quantities of interest. A probability distribution may be defined as to assign a probability to each of the possible outcomes of a random experiment. In the context of the present invention the random experiment may be understood as the rotation of the plurality of rolling elements within the roller bearing or the two bearing rings thereof. For the purpose of determining an indication of the signal quantity's probability distribution, the total time duration of the deformation signal may be subdivided into a plurality of time intervals. In this context, extracting statistical information of one or more signal quantities may comprise extracting, for the whole signal or for each time interval, one or more signal parameters from the group of deformation signal oscillation amplitude, time difference between adjacent deformation signal peaks, time difference between adjacent deformation signal maxima, and time difference between adjacent deformation signal minima, etc.

According to a particular embodiment providing the signal indicative of the probability distribution may comprise determining one or more histograms indicating a distribution of the one or more signal quantities of interest, respectively. In statistics, a histogram is a representation showing an impression of the distribution of data. It is an estimate of the probability distribution of a continuous variable. A histogram consists of tabular frequencies, shown as adjacent rectangles, erected over discrete intervals (bins), with an area equal to the frequency of the observations in the interval. The height of a bin is also equal to the frequency density of the interval, i.e., the frequency divided by the width of the interval. The total area of the histogram is equal to the number of data. A histogram may also be normalized displaying relative frequencies. It then shows the proportion of cases that fall into each of several categories, with the total area equaling 1. The categories are usually specified as consecutive, non-overlapping intervals of a variable. The categories (intervals) shall be adjacent, and often are chosen to be of the same size. The rectangles or bins of a histogram may be drawn so that they touch each other to indicate that the original variable is continuous. That is to say, in embodiments a histogram may be related to a distribution of a signal parameter from the group of signal oscillation amplitude, time difference between adjacent signal peaks, time difference between adjacent signal maxima, and time difference between adjacent signal minima. By looking at the individual waves of the sinusoidal load sensing or deformation signal, certain characteristics may be stored, like amplitude and/or time of the maximum and time of the minimum. After having gathered a lot of characteristics, the relative spacing in time of these measurements is analyzed. The relative spacing in time can be attributed to the roller spacing. By storing or forwarding only histograms of time spacing, peak-peak, maxima and minima the amount of data to be stored or sent can be greatly reduced.

In embodiments of the present invention providing statistical information of the one or more signal quantities of interest may comprise transmitting, over a data network, the determined statistical information, e.g. the histogram data, from a measurement node coupled to the roller bearing to a remote evaluation node of a communication network. Note, that the determined statistical information will usually comprise significantly less data than the raw deformation signal. That is to say, one advantage of embodiments is that roller spacing data may be presented in a very compact way (e.g. histogram), by which it is easier to analyze the condition of the bearing and also trend the change over time. Embodiments may also solve the problem of overloading a data network with raw data by sending only statistical information, yet accurate enough to register less likely events of failure, for example.

The statistical information may be transmitted from the roller bearing to an evaluation node by wire or wireless. In the latter case the communication is particularly flexible and no cumbersome installation of wire lines has to be performed, which may be beneficial for the use in moving trains, for example. Wireless transmitters with this respect for transmitting the statistical information may, for example correspond to one of the mobile communication systems or transceivers standardized by the 3rd Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), e.g. Universal Mobile Telecommunication System (UMTS), Long Term Evolution (LTE) or LTE-Advanced (LTE-A), or mobile communication systems with different standards, e.g. Multistandard Radio (MSR), Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Code Division Multiple Access (CDMA), Orthogonal Frequency Division Multiple Access (OFDMA) or any other technology with a multiplexing capable physical layer like Filter Bank Based Multicarrier (FBMC) systems. Of course, also short range communication systems such as Nanotron (Chirp Spread Spectrum), ANT, DUST, Wireless HART (Highway Addressable Remote Transducer Protocol), ISA100 (International Society of Automation), Bluetooth or ZigBee may be used.

Some embodiments comprise one or more programmable electrical control circuits installed within an apparatus for the mobile communication network for performing the above method. Such a programmable electrical control circuit, for example a Digital Signal Processor (DSP), Application Specific Integrated Circuit (ASIC), a Field Programmable Gate Array (FPGA), or a general purpose processor with hardware accelerators, for example, needs to be programmed accordingly. Hence, yet further embodiments also provide a computer program having a program code for performing embodiments of the method, when the computer program is executed on the programmable hardware device.

According to a further aspect it is provided an apparatus for detecting irregularities in a rotation of roller bodies in a roller bearing. The apparatus comprises a measurement module which is operable to provide a deformation signal indicative of a deformation of a surface region of a bearing ring of the roller bearing, wherein the deformation is due to the rotation of the roller bodies over or along said surface region. The apparatus also comprises a processor which is operable to extract one or more signal quantities of interest from the deformation signal and which is operable to provide statistical information on the one or more extracted signal quantities of interest. Thereby the apparatus may, in some embodiments, form a first node of a data network, the first node also comprising, beside the apparatus, the roller bearing coupled to the apparatus. The first network node may be a moveable network node. The apparatus may further comprise a transmitter operable to transmit the statistical information to a remote second node of the data network for evaluation purposes. The data transmission may take place according to any of the aforementioned communication concepts.

Some embodiments comprise one or more programmable electrical control circuits installed within the apparatus for detecting irregularities for performing embodiments of the above corresponding method. Such a programmable electrical control circuit, for example a Digital Signal Processor (DSP), a Field Programmable Gate Array (FPGA), or a general purpose processor with hardware accelerators, for example, needs to be programmed accordingly. Hence, yet further embodiments also provide a computer program having a program code for performing embodiments of the method, when the computer program is executed on the programmable hardware device.

To summarize, some embodiments of the present invention suggest using statistical information e.g. in form of histograms to average out various signal characteristics, such as, for example:
 signal amplitudes as an indicator of roller load,
 peak-to-peak spacings as an indicator of cage gap effects,
 roller spacing (valleys) as an indicator of movements of cage segments.

BRIEF DESCRIPTION OF THE FIGURES

Some embodiments of apparatuses and/or methods will be described in the following by way of example only, and with reference to the accompanying figures, in which

FIG. 2b shows an enlarged portion of the deformation signal of FIG. 2a;

DETAILED DESCRIPTION OF THE PRESENT INVENTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
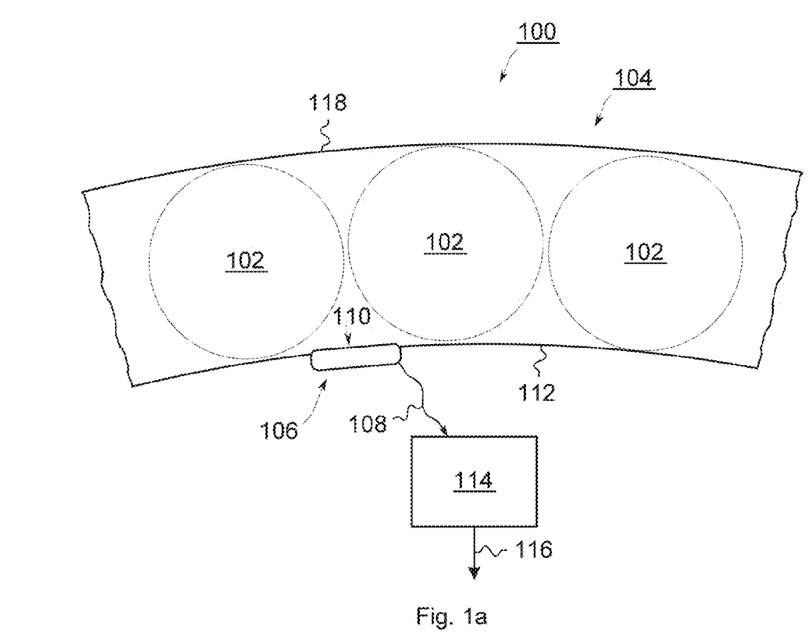
FIG. 1a shows a schematic embodiment of a measurement setup attached to an inner bearing ring of a roller bearing.

FIG. 1a schematically illustrates a side view of an apparatus 100 for detecting irregularities in a rotation of roller bodies 102 rotating in a roller bearing 104.

The apparatus 100 comprises a measurement module 106 which is operable or configured to provide a measured deformation signal 108 indicative of a deformation of a surface region 110 of an inner bearing ring 112 of the roller bearing 104. For example the measured deformation signal 108 may be provided online, i.e. on the fly, or offline, e.g. via accessing a memory device having stored a previously measured deformation signal 108. The elastic mechanical deformation of the surface region 110 is thereby due to the rotation of the roller bodies 102 over said bearing ring surface region 110, when the roller bearing is exposed to an axial and/or radial load. Furthermore, the apparatus 100 comprises a processor module 114 which is operable to extract one or more signal quantities/parts of interest from the measured or raw deformation signal 108 and which is operable to provide statistical information 116 on the one or more extracted signal quantities of interest. Thereby the data amount of the statistical information 116 is compressed vis-à-vis the data amount of the raw deformation signal 108.

According to some embodiments the measurement module 106 may comprise a deformation sensor for measuring or obtaining the deformation signal 108. Thereby the deformation sensor may be an inductive, capacitive, optical, or strain gauge based deformation sensor. Also FIG. 1a shows the measurement module 106 or its deformation sensor placed on the inner bearing ring 112 of the roller bearing 104. However, other embodiments of the present invention also allow measurement modules and/or deformation sensors thereof to be placed at a surface of the outer bearing ring 118. The sketched roller bearing 104 may be a roller bearing which can be used in wind power plants or trains, for example. That is to say, a diameter of the roller bearing 104 may be in the range from 0.1 m to 5 m, for example.

In some embodiments the apparatus 100 comprising the roller bearing 104, the measurement module 106 and the processor module 114 may form a first (movable) node of a data network. In such cases the apparatus 100 may further comprise transmitter circuitry (not shown) which is operable to transmit the statistical information 116 from the first (movable) network node to a remote second network node of the data network for further evaluation purposes. The term "remote" means that the second network node may be placed at a different geographical location than the first network node. For example, the second network node may be placed tens, hundreds or even thousands of meters away from the first network node. In some embodiments the transmitter (not shown in FIG. 1a) may be a wireless transmitter for wirelessly transmitting the statistical data 116 extracted from the measured deformation signal 108 from the first network node to the second network node. This may be particularly useful when the first network node is attached to a moving vehicle, for example.

Figure 1B:
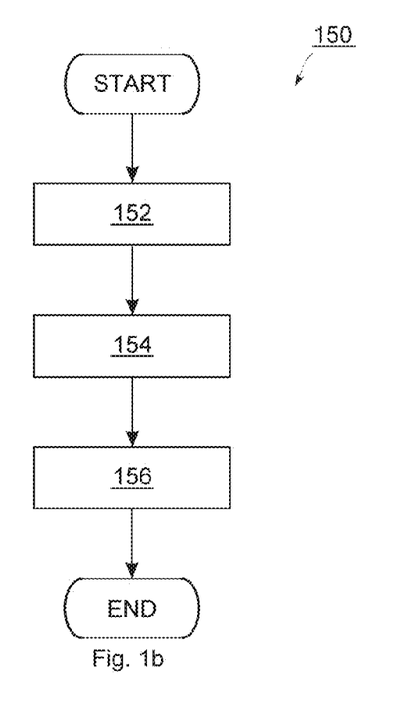
FIG. 1b shows a schematic flow chart of an exemplary method for detecting irregularities in spacing between roller bodies rotating in a roller bearing.

The apparatus 100, which has been explained with reference to FIG. 1a, may be configured to perform a method 150 for detecting irregularities in a rotation of the roller bodies 102 rotating in the roller bearing 104. An exemplary flowchart of the method 150 is illustrated in FIG. 1b.

The method 150 comprises a first step 152 of providing or measuring the deformation signal 108 which is indicative of an elastic deformation of the surface region 110 of the bearing ring 112 during operational state of the roller bearing 104. As has been explained, the elastic deformation will take place during a rotation of the roller bodies 102 around a common rotation axis over said surface region 110 when the bearing 104 is exposed to mechanical load. In next step 154 one or more signal quantities or signal parts of interest are extracted from the measured the deformation signal 108 in order to obtain statistical information or properties 116 on the one or more extracted signal quantities of interest. In a further step 156 the extracted statistical information 116 may be provided, for example, to a remote network node for further evaluation or analysis purposes. This may be done by transmitting the statistical information from the apparatus 100 coupled to the roller bearing 104 to a remote evaluation node of a data network for example.

According to embodiments of the present invention the extracted statistical information 116 may comprise one or more signals or quantities indicative of a probability distribution of the one or more deformation signal quantities of interest. In this context the one or more deformation signal quantities of interest may be regarded as random variables, as, in reality, in particular with respect to large roller bearings, deformation measurements show variations in amplitude and/or frequency of the measured deformation signal. Although the frequency variation can be seen in the spectrum and in the time signal, embodiments address the desire to get a more detailed analysis of the individual roller separation and peak amplitudes of the deformation signal 108.

Figure 2A:
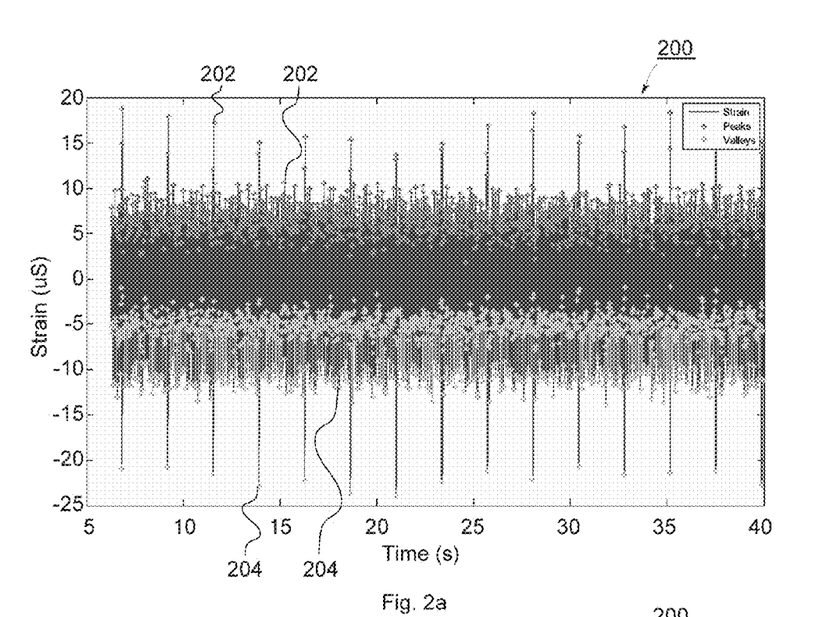
FIG. 2a shows an exemplary deformation signal.

FIG. 2a illustrates an exemplary deformation signal 200 measured by a strain gauge placed at a stationary inner bearing ring. The deformation signal 200 was measured for a large cylindrical roller bearing of a wind energy plant loaded with a radial load of 11400 kN at nominally 50 rounds per minute (rpm). FIG. 2a depicts the deformation signal 200 for a time interval reaching from approximately 5 to 40 seconds. As can be seen, the deformation signal 200 runs essentially sinusoidal and comprises various periodic components. The signal 200 comprises signal peaks, i.e., local signal maxima 202, as well as signal valleys, i.e., local signal minima 204. This becomes more evident from the enlarged depiction of the signal 200 in FIG. 2b.

Figure 2B:
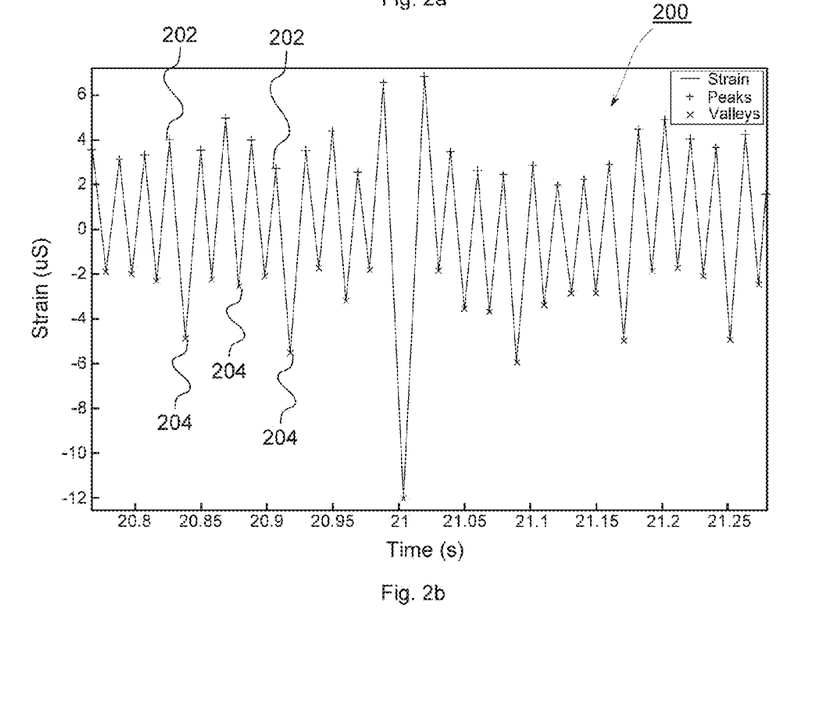

FIG. 2b thereby shows a signal portion of the deformation signal 200 of FIG. 2a in a time interval reaching from approximately 20.75 seconds to 21.30 seconds. The essentially sinusoidal course of the signal 200 as well as variations of signal amplitude may be recognized. That is to say, the absolute values of the signal maxima 202 and minima 204 are varying over time. In addition to the varying signal amplitude also a varying time difference between adjacent signal maxima 202 and/or adjacent signal minima 204 may be observed, leading to different frequency components in the deformation or measurement signal 200. Embodiments of the present invention suggest extracting compressed statistical information, e.g. a probability distribution, of the signal amplitude and/or the time separation of signal peaks 202, 204.

According to embodiments providing the signal indicative of the probability distribution may comprise determining one or more histograms indicating a distribution of the one or more signal quantities of interest (signal amplitude, time separation of signal peaks, etc.), respectively. In a more general mathematical sense, a histogram is a function that counts the number of observations that fall into each of the disjoint categories (known as bins), whereas the graph of a histogram is merely one way to represent a histogram. Thus, if we let n be the total number of observations and k be the total number of bins, the histogram mi meets the conditions $$n = \sum_{i=1}^{k} m_i.$$

In various embodiments, such a histogram may be related to a distribution of a signal parameter of the signal 200 from the group of a signal oscillation amplitude, a time difference between adjacent signal peaks 202, 204, time difference between adjacent signal maxima 202, and time difference between adjacent signal minima 204.

Figure 3A:
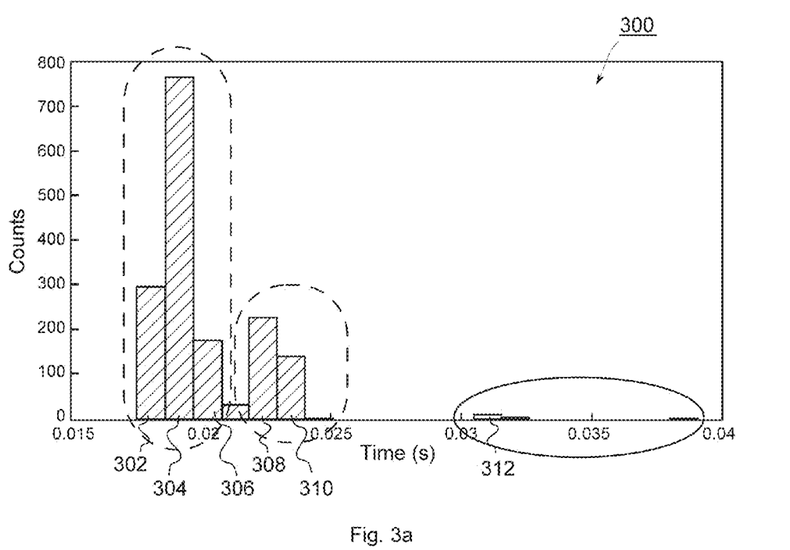
FIG. 3a shows a histogram related to a temporal separation of signal peaks of the deformation signal.

FIG. 3a exemplary depicts a histogram 300 for the signal quantity or observation "time separation of peaks" of the deformation signal 200.

A first bin 302 of the histogram 300 is placed at a bin center of 0.0181 s having bin edges at $-\infty$ and 0.0187 s, and having a bin count of 296. That is to say, in 296 cases the time separation between two adjacent signal peaks is lower than 0.0187 s. A second bin 304 of the histogram 300 is placed at a bin center of 0.0192 s having bin edges at 0.0187 s and 0.0197 s, and having a bin count of 764. That is to say, in 764 cases the time separation between two adjacent signal peaks is between 0.0187 s and 0.0197 s. A third bin 306 of the histogram 300 is placed at a bin center of 0.0203 s having bin edges at 0.0197 s and 0.0208 s, and having a bin count of 175. That is to say, in 175 cases the time separation between two adjacent signal peaks is between 0.0197 s and 0.0208 s. The first three bins 302 to 306 represent a probability distribution of the temporal separation of two adjacent roller bodies 102.

A fourth bin 308 of the histogram 300 is placed at a bin center of 0.0224 s having bin edges at 0.0219 s and 0.0229 s, and having a bin count of 228. That is to say, in 228 cases the time separation between two adjacent signal peaks is between 0.0219 s and 0.0229 s. A fifth bin 310 of the histogram 300 is placed at a bin center of 0.0235 s having bin edges at 0.0229 s and 0.0240 s, and having a bin count of 143. That is to say, in 143 cases the time separation between two adjacent signal peaks is between 0.0229 s and 0.0240 s. Thereby the bins 308 and 310 represent a probability distribution of the temporal separation of two adjacent bearing cage segments.

A sixth bin 312 of the histogram 300 is placed at a bin center of 0.0310 s having bin edges at 0.0305 s and 0.0315 s, and having a bin count of 10. Thereby the bins around bin 312 represent a probability distribution of the duration of a cage rotation.

Figure 3B:
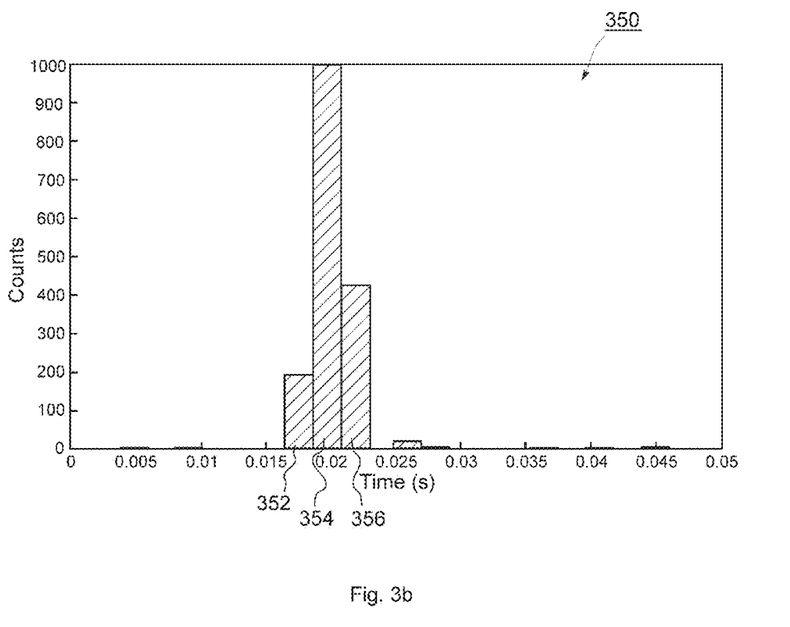
FIG. 3b shows a histogram related to a temporal separation of signal valleys of the deformation signal.

FIG. 3b exemplarily depicts a histogram 350 for the signal quantity or observation "time separation of valleys" of the deformation signal 200. It can clearly be seen that in this example the core area of the histogram 350 is formed the three bins 352, 354, and 356 around 0.02 s. There are some further bins located below 0.015 s and over 0.025 s, which indicate effects like cage rotation or separation of two adjacent bearing cage segments, etc.

Figure 4A:
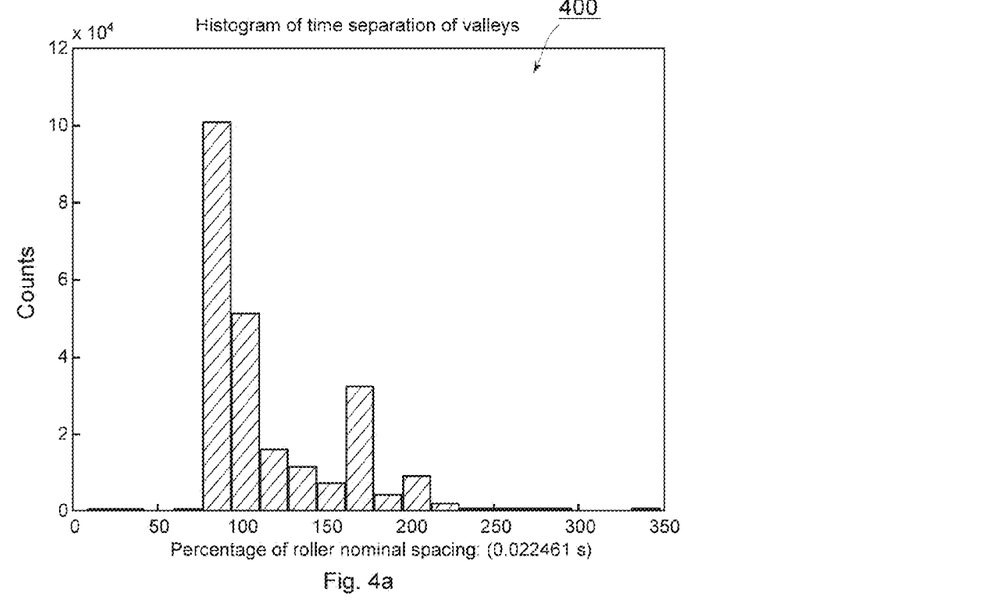
FIG. 4a shows a further histogram related to a temporal separation of signal valleys of the deformation signal.
Figure 4B:
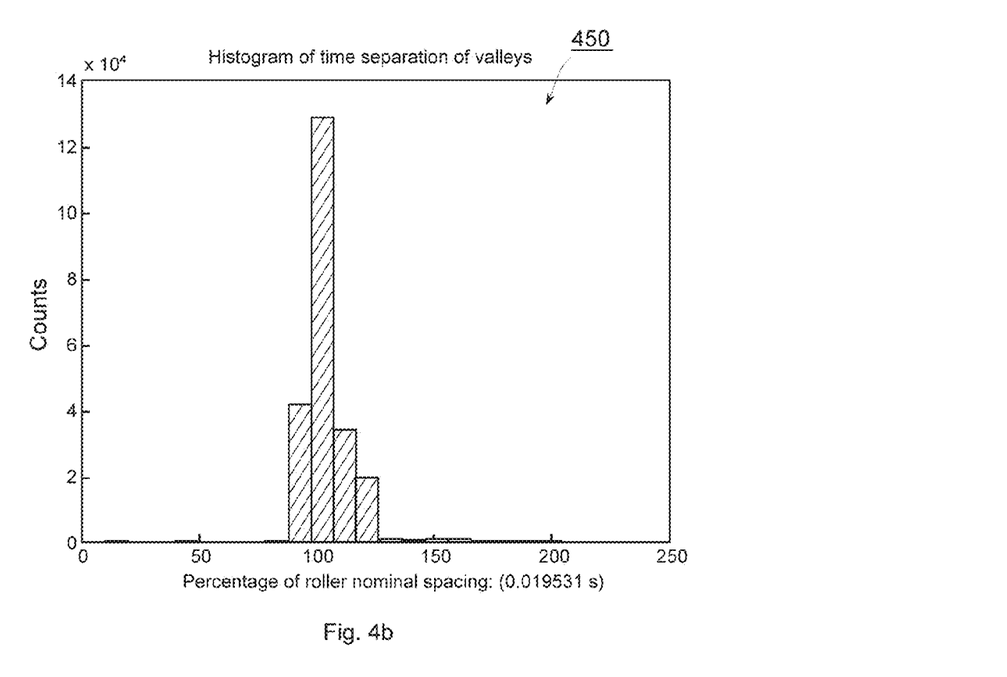
FIG. 4b shows another histogram related to a temporal separation of signal valleys of the deformation signal.

FIGS. 4a and 4b illustrate exemplary histograms 400 and 450 for the signal quantity or observation "time separation of valleys" of two different deformation signals. While the ordinate is related to event or observation counts, the abscissa is related to a percentage of the nominal roller spacing, which is 0.022461 s for FIG. 4a and 0.019531 s for FIG. 4b. It can be seen that the histogram 400 of FIG. 4a shows a much larger standard deviation of the measured roller spacing than FIG. 4b.

FIGS. 3a to 4b can be summarized as follows: Most peaks are separated by 0.0192 seconds (52.083 Hz). Most valleys are separated by 0.0197 seconds (50.76 Hz). The rotational speed is approximately 50 rpm, which gives a ball pass frequency of 48 Hz if the rollers would be evenly spaced. A significant number of peaks are separated by 0.0235 seconds, which is 22.4% above normal which can be attributed to cage segment separation. The separation for every cage rotation is approximately: 170% more than the normal roller spacing! At one extreme, this is: 0.0385 seconds, which is 100% more (a roller would fit in between).

Figure 5:
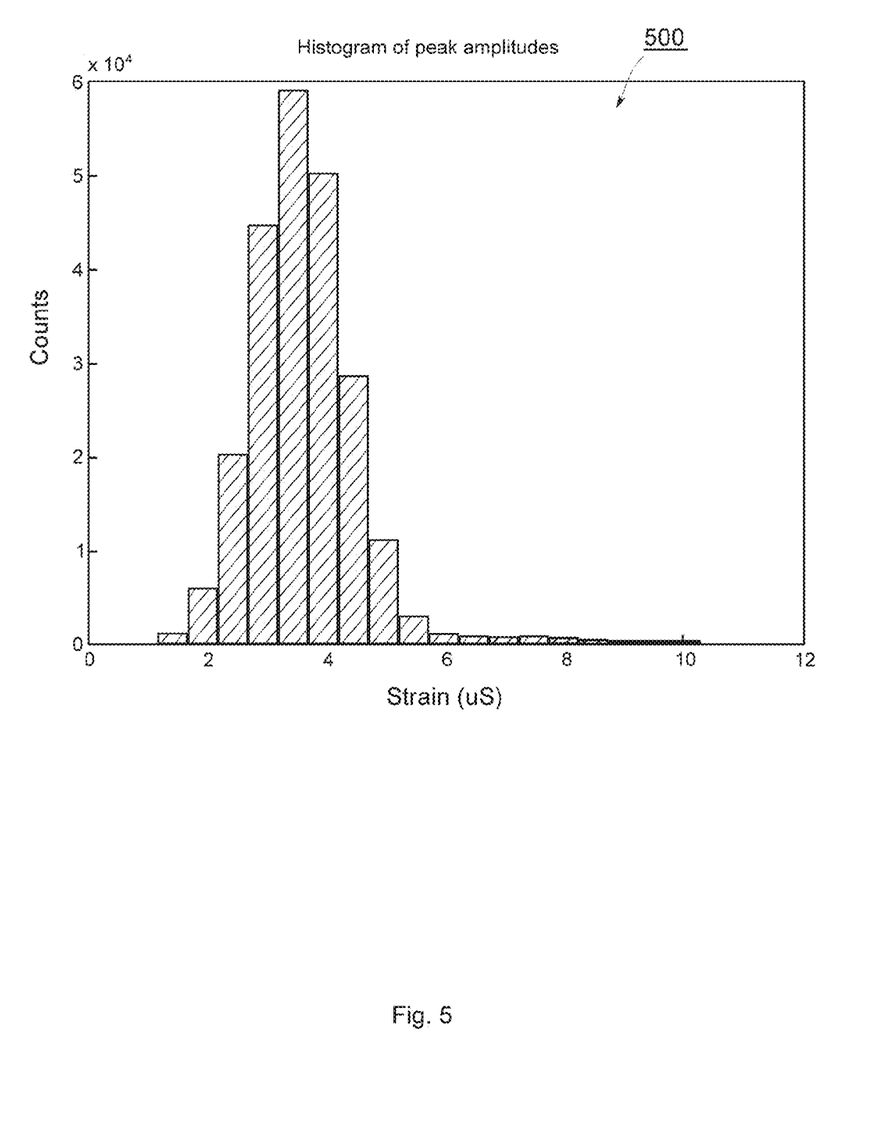
FIG. 5 shows a histogram related to strain of signal peak amplitudes.

FIG. 5 shows an exemplary histogram 500 for the signal quantity or observation "peak amplitudes" of a measured deformation signal. While the ordinate is related to event counts, the abscissa is related to measured strain due to mechanical deformation. Thereby strain may be defined as the change in length divided by the original length of a strain gauge, often expressed in millionths of an inch per inch, or microstrain (µS).

Figure 6:
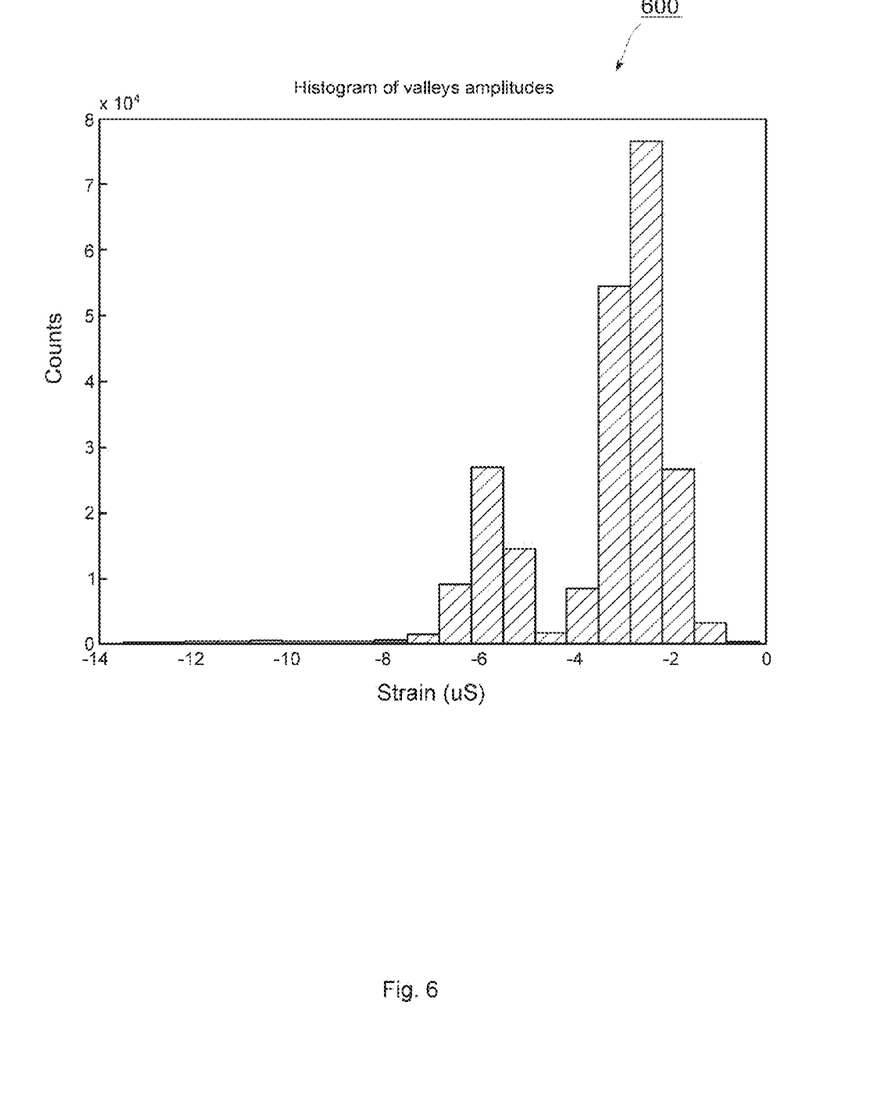
FIG. 6 shows a histogram related to strain of signal valley amplitudes.

FIG. 6 shows an exemplary histogram 600 for the signal quantity or observation "valley amplitudes" of a measured deformation signal. While the ordinate is related to event or observation counts, the abscissa is again related to measured strain in the unit microstrain (µS).

Figure 7:
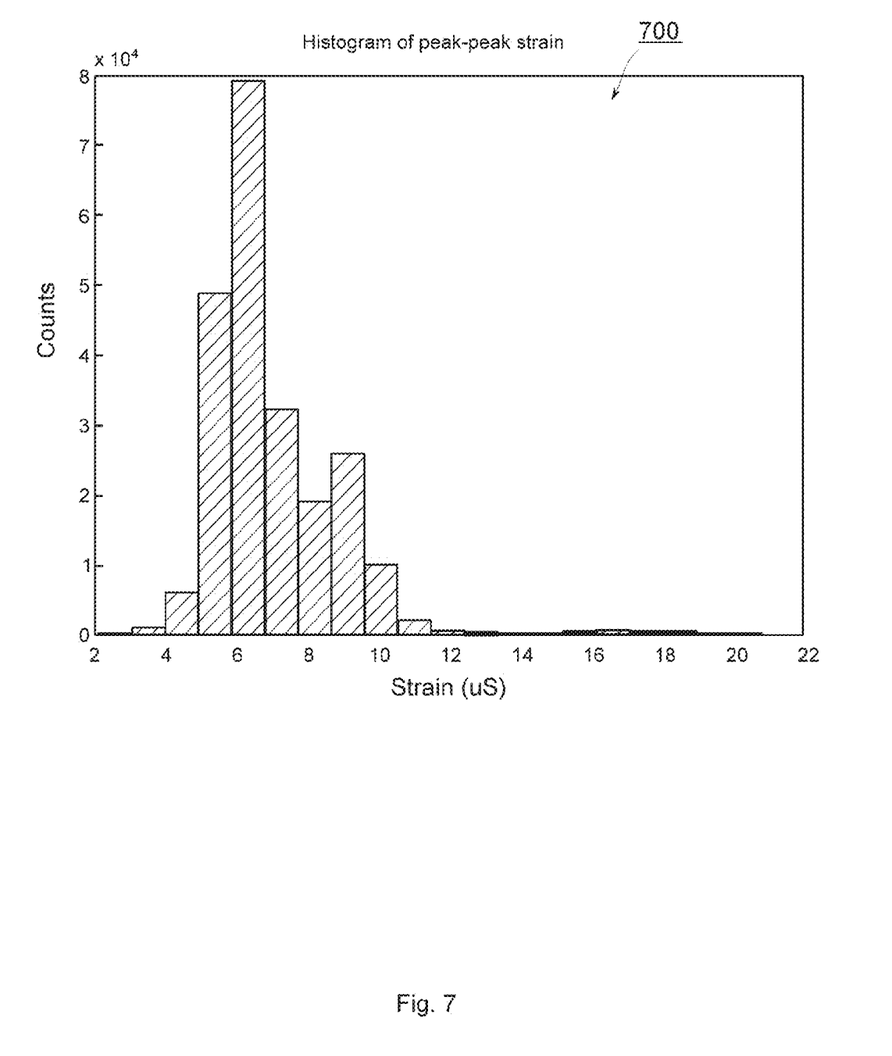
FIG. 7 shows a histogram related to signal peak-to-peak strain.

FIG. 7 shows an exemplary histogram 700 for the signal quantity or observation "peak-peak strain" of a measured deformation signal. While the ordinate is related to event or observation counts, the abscissa is again related to measured strain in the unit microstrain (µS).

Thereby a normal peak-peak strain is about 6 µS at nominal load of. 11400 kN on the bearing at 50 rpm, for example. The cage segment separation shows a clear decrease in strain (looking at the valley statistics of FIG. 6). An exemplary extreme peak-peak value can be up to 20 µS.

To summarize, some embodiments of the present invention suggest histograms to average out various characteristics, for example:
  Amplitude as an indicator for roller load
  Peak-peak as an indicator for cage gap effects
  Roller spacing (valleys) as an indicator for movements of
    cage segments
  Overalls that may be obtained from histograms are, for
example:
  maximum count for amplitude
  maximum count for peak–peak maximum roller spacing above (frot/2)/(2*num rollers), wherein frot is the rotation frequency (e.g. 50 rpm), and num rollers is the number of roller bodies.

The advantage of embodiments is that roller spacing data may be presented in a very compact way (e.g. by a histogram), by which it is easier to analyze the condition of the bearing and also trend the change over time. Embodiments may also avoid overloading the network with raw data by sending only statistical information, yet accurate enough to register the less likely events.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " or "module for . . . " (performing a certain function) shall be understood as functional blocks comprising circuitry that is adapted for performing a certain function, respectively. Hence, a "means for s.th." or a "module for . . . " may as well be understood as a "means being adapted or suited for s.th." or a "module being adapted or suited for s.th.". A means or module being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

LIST OF REFERENCE NUMERALS

100 apparatus for detecting irregularities in a rotation of roller bodies
102 roller bodies
104 roller bearing
106 measurement module
108 deformation signal
110 surface region of bearing ring
112 inner bearing ring
114 processor module
116 statistical information
118 outer bearing ring
150 method for detecting irregularities in a rotation of roller bodies
152 providing a deformation signal
154 extracting one or more signal quantities of interest from the deformation signal
156 providing statistical information on the one or more extracted signal quantities of interest
200 deformation signal
202 signal maxima
204 signal minima
300 histogram of time separation of peaks
350 $1^{st}$ histogram of time separation of valleys
400 $2^{nd}$ histogram of time separation of valleys
450 $3^{rd}$ histogram of time separation of valleys
500 histogram of peak amplitudes
600 histogram of valley amplitudes
700 histogram of peak-peak strain

The invention claimed is:

1. A method for detecting irregularities in a rotation of roller bodies in a roller bearing, the method comprising steps of:
    measuring, by a deformation sensor coupled to a surface region of a bearing ring of the roller bearing, a load transferred between the roller bodies and the surface region during an operational state of the roller bearing;
    providing a deformation signal in accordance with the load measured by the deformation sensor, the deformation signal comprising any of the irregularities in the roller bearing, at least one of the irregularities comprising a deformation of the surface region, wherein the deformation comprises an elastic mechanical deformation due to the rotation of the roller bodies over the surface region;

extracting one or more signal quantities of interest from the deformation signal; and providing statistical information on the one or more extracted signal quantities of interest.

2. The method according to claim 1, wherein the step of providing the statistical information further comprises providing a signal indicative of a probability distribution of the one or more signal quantities of interest.

3. The method according to claim 1, wherein the deformation sensor comprises at least one strain gauge comprising a foil that electrical resistance in accordance with the deformation of the surface region.

4. The method according to claim 1, wherein the deformation of the surface region is essentially perpendicular to a rotation axis of the roller bearing.

5. The method according to claim 1, wherein the step of providing the deformation signal further comprises storing the deformation signal in a memory device for a subsequent statistical analysis.

6. The method according to claim 1, wherein a total time duration of the deformation signal is subdivided into a plurality of time intervals, and wherein extracting one or more signal quantities comprises extracting, for each time interval, one or more signal parameters from the group of signal oscillation amplitude, time difference between adjacent signal peaks, time difference between adjacent signal maxima, and time difference between adjacent signal minima.

7. The method according to claim 1, wherein the step of providing the statistical information further comprises determining one or more histograms indicating a distribution of the one or more signal quantities of interest, respectively.

8. The method according to claim 7, wherein one histogram of the one or more histograms is related to a distribution of a signal parameter from the group of signal oscillation amplitude, time difference between adjacent signal peaks, time difference between adjacent signal maxima, and time difference between adjacent signal minima.

9. The method according to claim 1, wherein the step of providing the statistical information further comprises transmitting, over a data network, the statistical information from a measurement node coupled to the roller bearing to a remote evaluation node of the network.

10. A computer program product stored on a non-transitory computer readable medium, the computer program product comprising program code executable to cause a method comprising steps of:

measuring, by a deformation sensor coupled to a surface region of a bearing ring of the roller bearing, a load transferred between the roller bodies and the surface region during an operational state of the roller bearing;

providing a deformation signal in accordance with the load measured by the deformation sensor, the deformation signal comprising any of the irregularities in the roller bearing, at least one of the irregularities comprising a deformation of the surface region, wherein the deformation comprises an elastic mechanical deformation due to the rotation of the roller bodies over the surface region; and providing statistical information on the one or more extracted signal quantities of interest, when the computer program is executed on a programmable hardware device.

11. An apparatus for detecting irregularities in a rotation of roller bodies in a roller bearing, the apparatus comprising:

a measurement module coupled to a surface region of a bearing ring of the roller bearing, the measurement module operable to:

measure a load transferred between the roller bodies and the surface region during an operational state of the roller bearing, and provide a deformation signal in accordance with the load measured by the deformation sensor, the deformation signal comprising any of the irregularities in the roller bearing, at least one of the irregularities comprising a deformation of the surface region, wherein the deformation comprises an elastic mechanical deformation due to the rotation of the roller bodies over the surface region; and a processor module operable to extract one or more signal quantities of interest from the deformation signal and operable to provide statistical information on the one or more extracted signal quantities of interest.

12. The apparatus according to claim 11, wherein the apparatus forms a first node of a data network, and wherein the apparatus further comprises a transmitter operable to transmit the statistical information to a remote second node of the data network for evaluation.

13. The apparatus according to claim 12, wherein the transmitter is a wireless transmitter.

14. The apparatus according to claim 12, wherein the first node is configured having the roller bearing coupled to the apparatus.

15. The apparatus according to claim 11, wherein the roller bearing is a roller bearing of one of a wind power plant or a vehicle and wherein the apparatus is locally attached to the one of the wind power plant or the vehicle.

* * * * *